United States Patent
Lee

(10) Patent No.: US 8,812,041 B2
(45) Date of Patent: Aug. 19, 2014

(54) TAP-TO-END FEATURE FOR UNLOCKING A VIRTUAL SLIDE-TO-LOCK FEATURE IN PUSH-TO-TALK COMMUNICATION APPLICATIONS

(75) Inventor: Justin V. Lee, Berkeley, CA (US)

(73) Assignee: Voxer IP LLC, San Francisco, CA (US)

( * ) Notice: Subject to any disclaimer, the term of this patent is extended or adjusted under 35 U.S.C. 154(b) by 248 days.

(21) Appl. No.: 13/540,969

(22) Filed: Jul. 3, 2012

(65) Prior Publication Data

US 2014/0011533 A1    Jan. 9, 2014

(51) Int. Cl.
  *H04W 4/10*    (2009.01)

(52) U.S. Cl.
  USPC ............................ 455/518; 455/517; 455/519

(58) Field of Classification Search
  CPC ............ H04W 4/10; G06K 9/23; G06K 9/20; G06F 3/033
  USPC .................................................. 455/517–519
  See application file for complete search history.

(56) References Cited

U.S. PATENT DOCUMENTS

| | | | |
|---|---|---|---|
| 2005/0079896 A1* | 4/2005 | Kokko et al. | 455/566 |
| 2005/0253817 A1* | 11/2005 | Rytivaara et al. | 345/173 |
| 2007/0150842 A1* | 6/2007 | Chaudhri et al. | 715/863 |
| 2008/0309632 A1* | 12/2008 | Westerman et al. | 345/173 |
| 2011/0237220 A1* | 9/2011 | Matsuoka | 455/411 |
| 2013/0295982 A1* | 11/2013 | Lee et al. | 455/518 |

* cited by examiner

*Primary Examiner* — Bobbak Safaipour
(74) *Attorney, Agent, or Firm* — Beyer Law Group LLP

(57) ABSTRACT

A Tap-to-End feature for unlocking a virtual Slide-to-Lock lock feature on a display screen of the communication device running a PTT application. In one embodiment, the Tap-to-End is implemented by simply tapping the display screen. In a second embodiment, the Tap-to-End feature is implemented by contacting the display screen on the communication device running the PTT application for a predetermined period of time. When the threshold is exceeded, the Slide-to-lock feature is unlocked. In various embodiments, the threshold is 3 seconds or less. In yet other embodiments, the Tap-to-End feature may be implemented anywhere on the display screen of the communication device running the PTT application including, but not limited to, in the vicinity of where the virtual Slide-to-lock feature is implemented.

8 Claims, 11 Drawing Sheets

TAP-TO-END FEATURE FOR UNLOCKING A VIRTUAL SLIDE-TO-LOCK FEATURE IN PUSH-TO-TALK COMMUNICATION APPLICATIONS

CROSS-REFERENCE TO RELATED APPLICATIONS

This application is related to U.S. application Ser. No. 13/464,139 entitled VIRTUAL SLIDE-TO-LOCK FEATURE FOR PUSH-TO-TALK COMMUNICATION APPLICATIONS, filed May 4, 2012, and incorporated herein by reference for all purposes.

BACKGROUND

1. Field of the Invention

The present invention relates to Push-to-Talk (PTT) communications, and more particularly, to a Tap-to-End feature for unlocking a virtual Slide-to-Lock lock feature on a communication device running a PTT application.

2. Description of Related Art

In recent years, mobile communications and computing has become prevalent. More and more people are using mobile communication devices, such as smart phones and tablets, for a variety of reasons. In addition to conventional mobile telephony, individuals also use mobile communication devices for emailing, accessing the Internet, reading e-books, playing video games, and engaging in social networking, etc. Within social networking, PTT communication applications have become popular.

The Voxer® Walkie Talkie application, distributed by the assignee of the present application, is one well known PTT application, which runs on communication devices, such as smart phones, tablets and computers. With Voxer, a user is required to select a virtual "Hold-to-Talk" feature appearing on a screen of the communication device for the duration of a message. As the media of the message is created, the media is progressively stored and progressively streamed to the intended recipient(s), provided the Hold-to-Talk feature is selected. For further details on the Voxer application, see co-pending, commonly assigned, U.S. application Ser. No. 12/037,749, incorporated by reference herein for all purposes. Other known PTT applications also include a similar virtual PTT feature, which must be held for the duration of a message. These other PTT applications, however, are not progressive. Instead they rely on a store and forward protocol for first the recording of a message, and then the transmission of the message once it is complete.

Regardless of the type of PTT application, the need to continuously select a PTT feature (either Hold-to-Talk or a similar descriptor) is often problematic. For example, a user may inadvertently de-select the PTT feature in the middle of a message, causing an interruption or termination in the progressive storing and/or transmission of the media. As a result, the recipient(s) may receive an interrupted, partial, message. Also continuously holding the PTT feature is often inconvenient, particularly for a long period of time. The Voxer application, for example, is capable of supporting full-duplex communication, allowing two (or more) participants of a conversation to engage in near real-time communication, similar to a synchronous telephone call. Participants are therefore required to select the PTT feature for the entire duration of the full-duplex exchange, which may be inconvenient after a certain period of time.

The aforementioned Voxer® Walkie Talkie application includes an optional virtual "Talk" feature that may be used instead of the Hold-to-Talk feature. With the Talk feature, a user is required to initially select the virtual Talk feature to initiate the start of a message. When the message is complete, the Talk feature is de-selected, terminating the message. While convenient during near real-time, full-duplex, communication, the Talk feature has its own inconveniences. For example, the Talk feature is often inadvertently selected, causing the creation of "false" messages. If the user is unaware of the situation, a potentially long, data intensive, message that consumes bandwidth may be transmitted.

SUMMARY OF THE INVENTION

The present invention is directed to a Tap-to-End feature for unlocking a virtual Slide-to-Lock lock feature on a display screen of the communication device running a PTT application. In one embodiment, the Tap-to-End is implemented by tapping the display screen. In a second embodiment, the Tap-to-End feature is implemented by contacting the display screen on the communication device running the PTT application for a predetermined period of time. When the threshold is exceeded, the Slide-to-lock feature is unlocked. In various embodiments, the threshold is 3 seconds or less. In yet other embodiments, the Tap-to-End feature may be implemented anywhere on the display screen of the communication device running the PTT application including, but not limited to, in the vicinity of where the virtual Slide-to-lock feature is implemented.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obstruct the invention.

Figure 1:
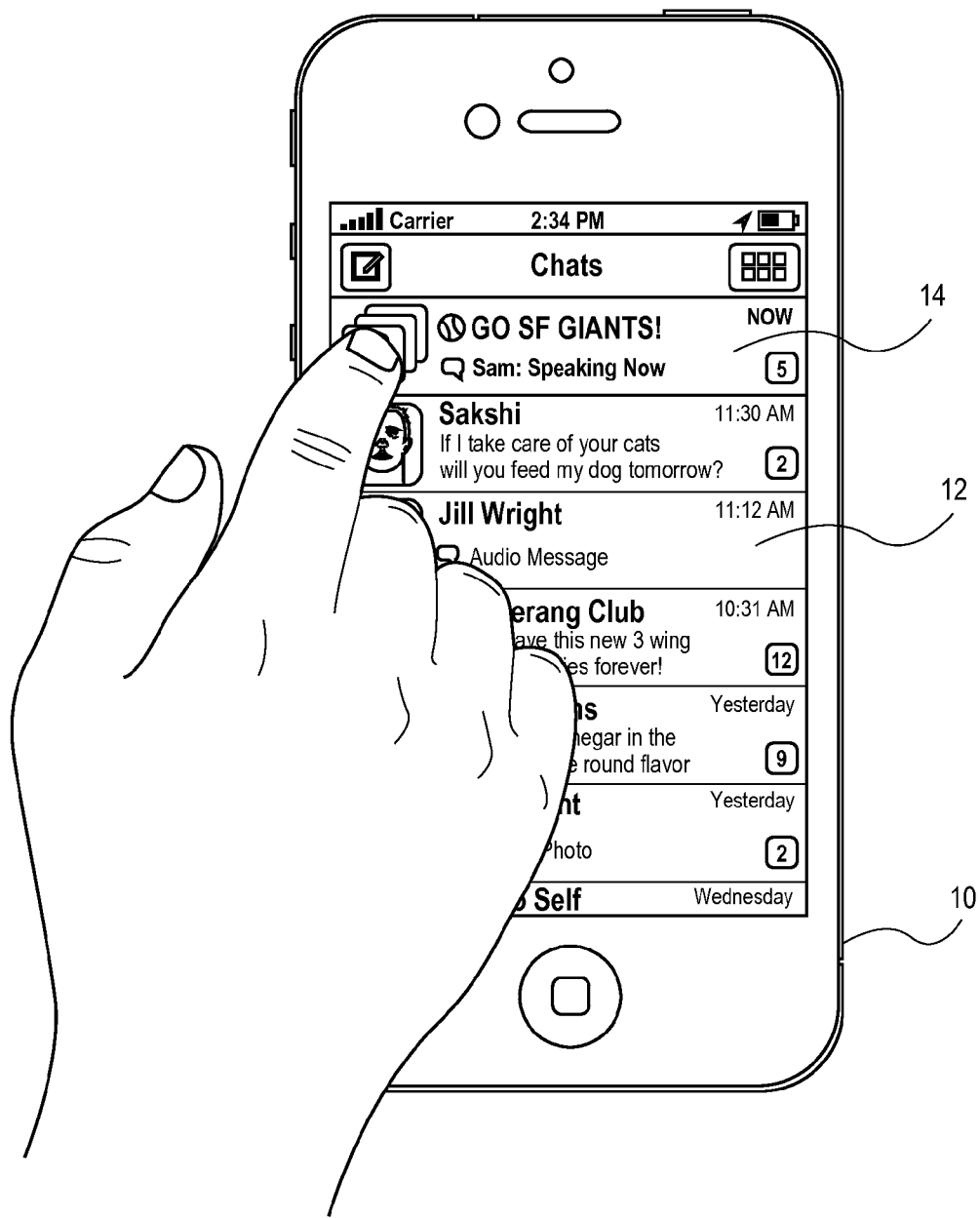
FIG. 1 is an exemplary, non-exclusive, embodiment of a mobile communication device running a PTT application in accordance with the principles of the present invention.

Referring to FIG. 1, a non-exclusive embodiment of a communication device 10 running a PTT application in accordance with the principles of the present invention is shown. In this particular embodiment, a list of active conversations or "chats" is displayed on the touch-screen 12 of the device 10. For the purpose of illustrating the virtual Slide-to-Lock feature of the present application, the figure shows a user of the device 10 selecting a conversation 14 entitled "GO SF GIANTS". The virtual Slide-to-Lock feature is described in detail below within the context of this conversation.

Figure 2A:
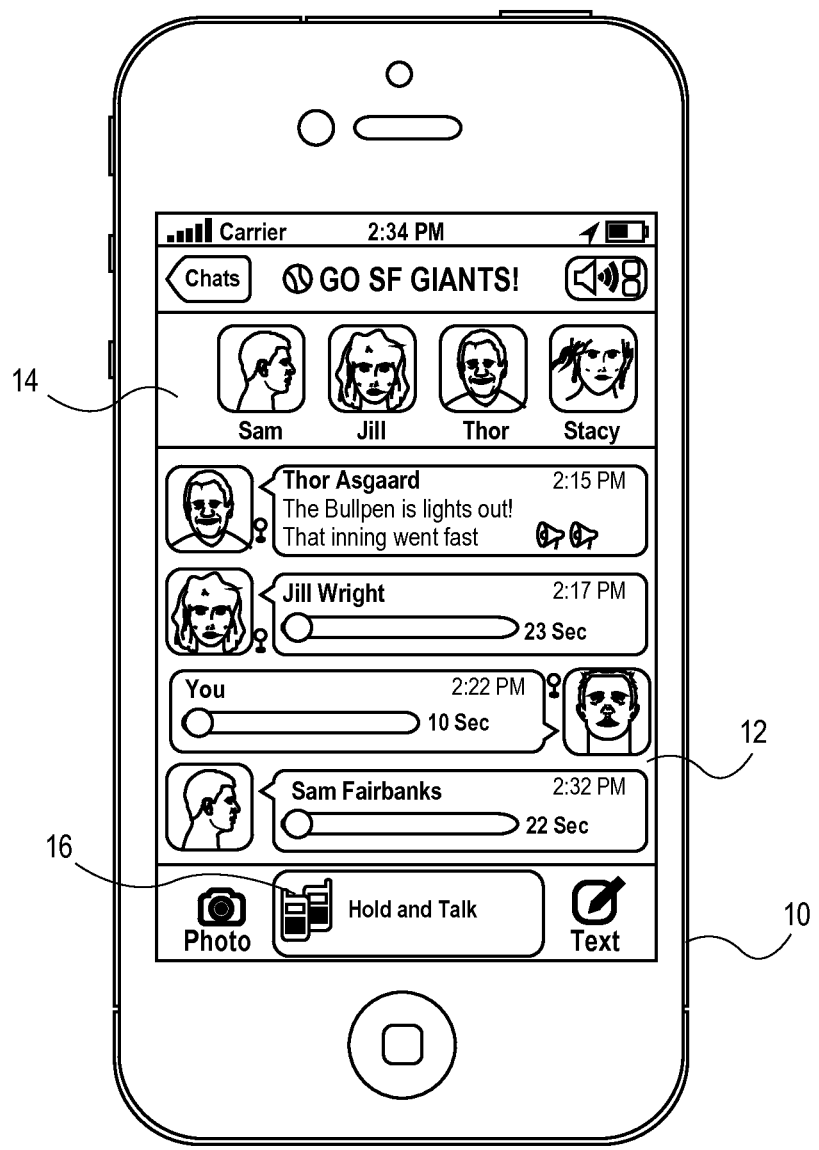
FIGS. 2A-2D are exemplary diagrams of the activation of a virtual Slide-to-Lock feature for use in cooperation with a PTT application in accordance with the principles of the present invention.

Referring to FIGS. 2A-2D, a series of diagrams showing the activation and de-activation of a virtual "Slide-to-Lock" feature according to one non-exclusive embodiment is illustrated. In FIG. 2A, the conversation history of the GO SF GIANTS conversation is displayed after the selection is made. In addition to the conversation history, a virtual PTT region 16, labeled "Hold and Talk", is provided on the screen 12.

Figure 2B:
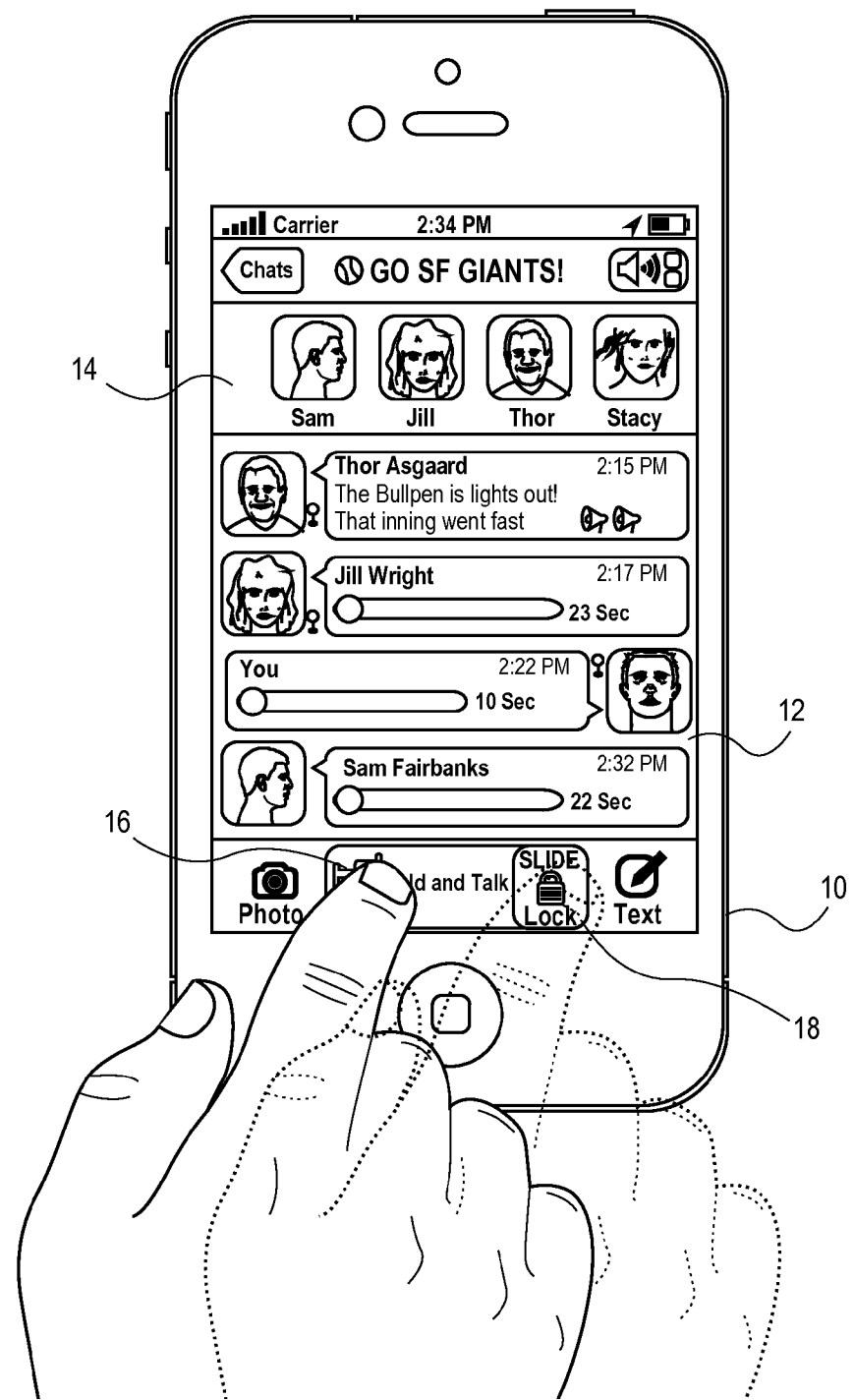

In a non-exclusive embodiment, as illustrated in FIG. 2B, a "Slide-to-Lock" feature 18 appears when the Hold to Talk region 16 is contacted. Alternatively, the Slide-to-Lock feature 18 may always appear in the region 16.

Figure 2C:
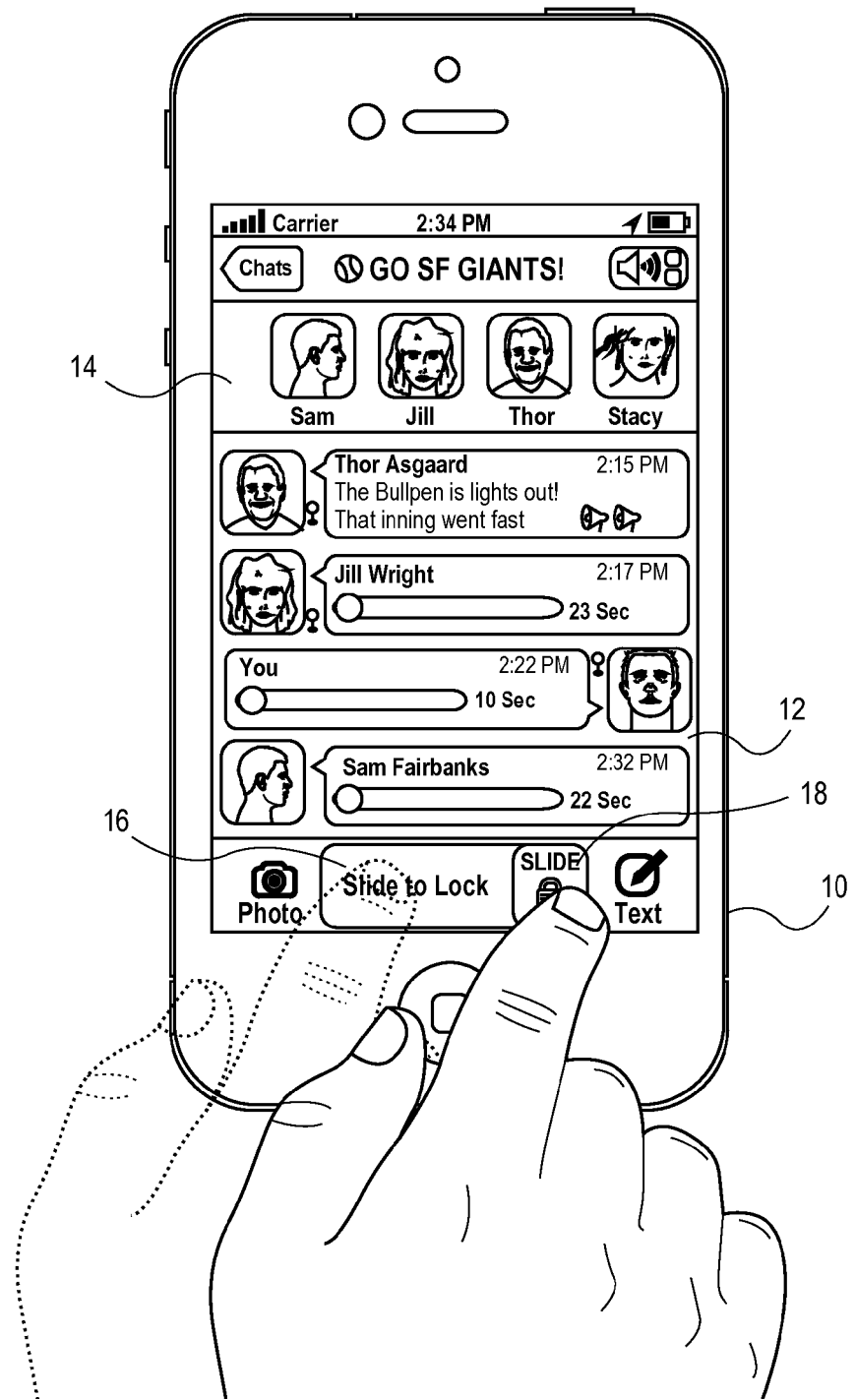

Regardless of the embodiment, the virtual "Slide-to-Lock" feature 18 is activated by the user sliding a finger from left to right over the region 16, until the Slide-to-Lock feature 18 is contacted. When this sliding motion is detected on the touch-sensitive display screen 12, it signifies the selection of the Slide-to-Lock feature 18. As a result, the text displayed in the region 16 changes from "Hold to Talk" to "Slide-to-Lock", as illustrated in FIG. 2C.

When the Slide-to-Lock feature 18 is activated, it results in the activation of a PTT locking function on device 10. When the PTT locking function is activated, the user of device 10 no longer needs to select or hold the region 16 and/or 18 while creating a message. Rather, the user can simply speak into the microphone, or generate other types of media, without having to hold or contact the region 16 and/or 18.

Figure 2D:
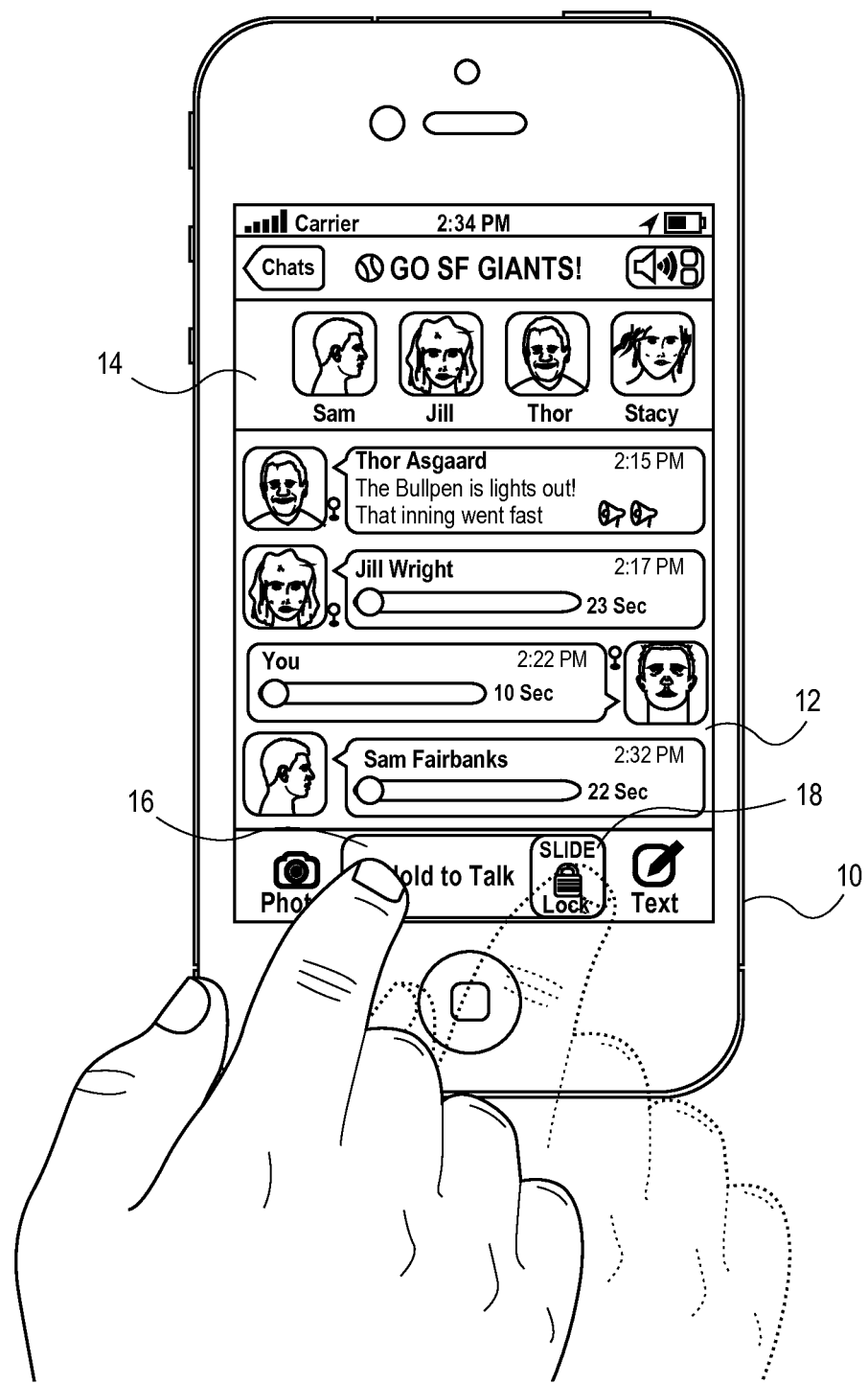

The PTT locking function may be de-activated in one of several ways. The Slide-to-Lock feature 18 can be used for de-activation by sliding a finger from region 18 to region 16, as illustrated in FIG. 2D. Alternatively, the PTT locking function can be automatically de-activated by returning to the active conversations list as illustrated in FIG. 1, or closing out of the PTT application altogether. In the latter two methods, a deliberate action to de-active the virtual Slide-to-Lock feature, as described above, is not required The requirement of sliding a finger across both regions 16 and 18 helps reduce the incidence of false positives when either activating or de-activating the PTT locking function using the virtual Slide-to-Lock feature. Alternatively, however, the user can simply contact to the region 16 for the duration of a message if using the virtual Slide-to-Lock feature 18 is not desirable. In the latter case, the user can simply maintain finger contact with the "Hold to Talk" region 16, or a similar PTT feature, for the duration of the message.

In various embodiments, the activation of the PTT locking function with the Slide-to-Lock feature 18, as described above, may be used with different types of PTT applications. For example, the Slide-to-Lock feature 18 may be used with both (i) progressive type PTT applications where a message is transmitted as the media is created and progressively stored and (ii) store and forward type PTT applications where the message is transmitted out of storage after the message is complete.

Figure 3:
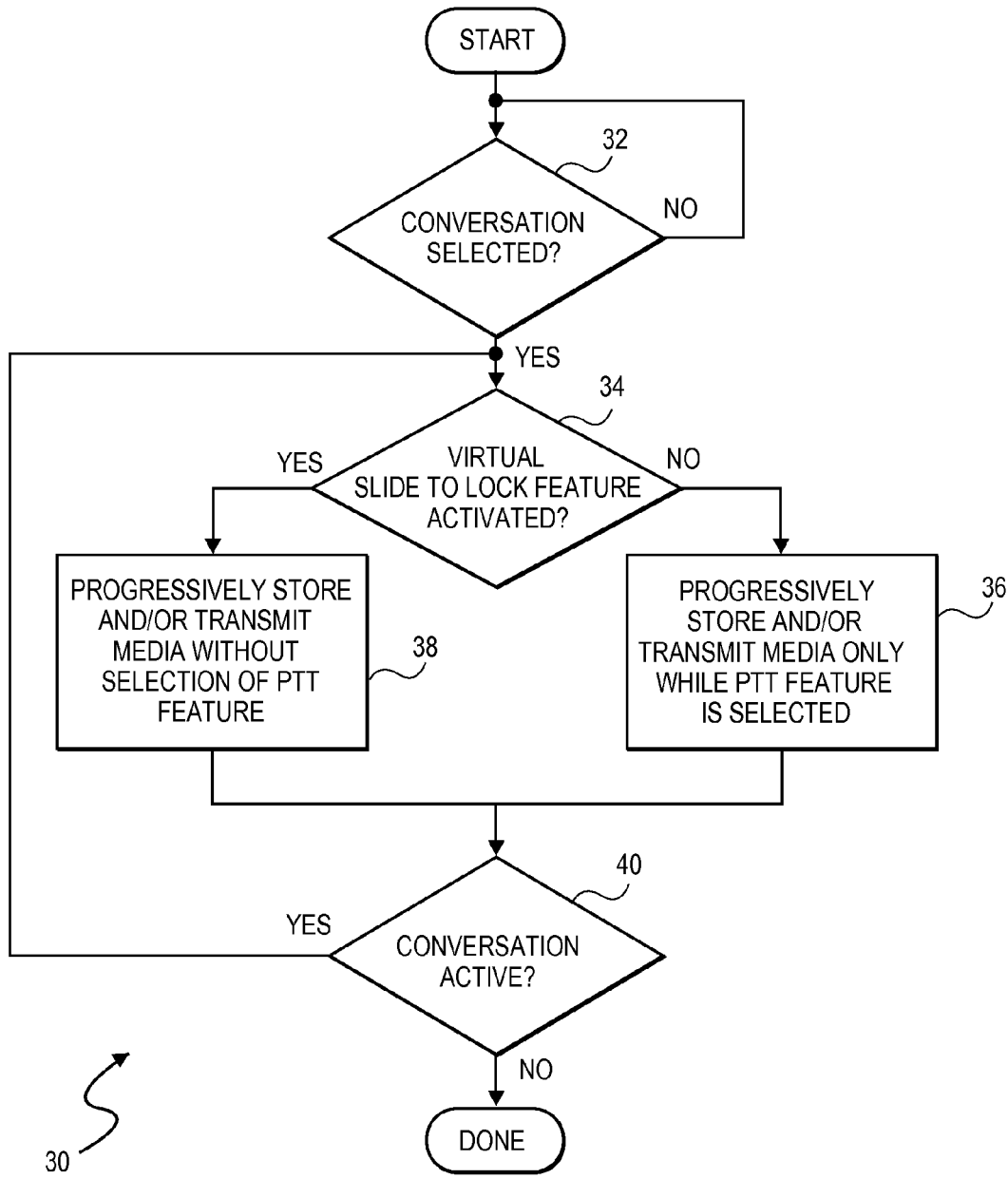
FIG. 3 is flow diagram illustrating the steps of a non-exclusive embodiment for implementing the virtual Slide-to-Lock feature in accordance with the principles of the present invention.

Referring to FIG. 3, a flow diagram 30 illustrating operation of the virtual Slide-to-Lock feature on the device 10 is illustrated. In the initial decision step 32, it is determined if a conversation has been selected. If yes, then it is determined if the virtual Slide-to-Lock 18 feature has been implemented in decision 34. If not, then media of an outgoing message is progressively stored and/or transmitted (Step 36) only when the Hold-to-Talk region 16 or similar PTT feature is contacted. If yes, the PTT locking function is activated and media of an outgoing message is progressively stored and/or transmitted (step 38), without the requirement of maintaining contact with the Hold-to-Talk region 16 or a similar PTT feature. As determined in decision 40, the above-described process is continually repeated, so long as the user actively participates in the conversation.

Figure 4:
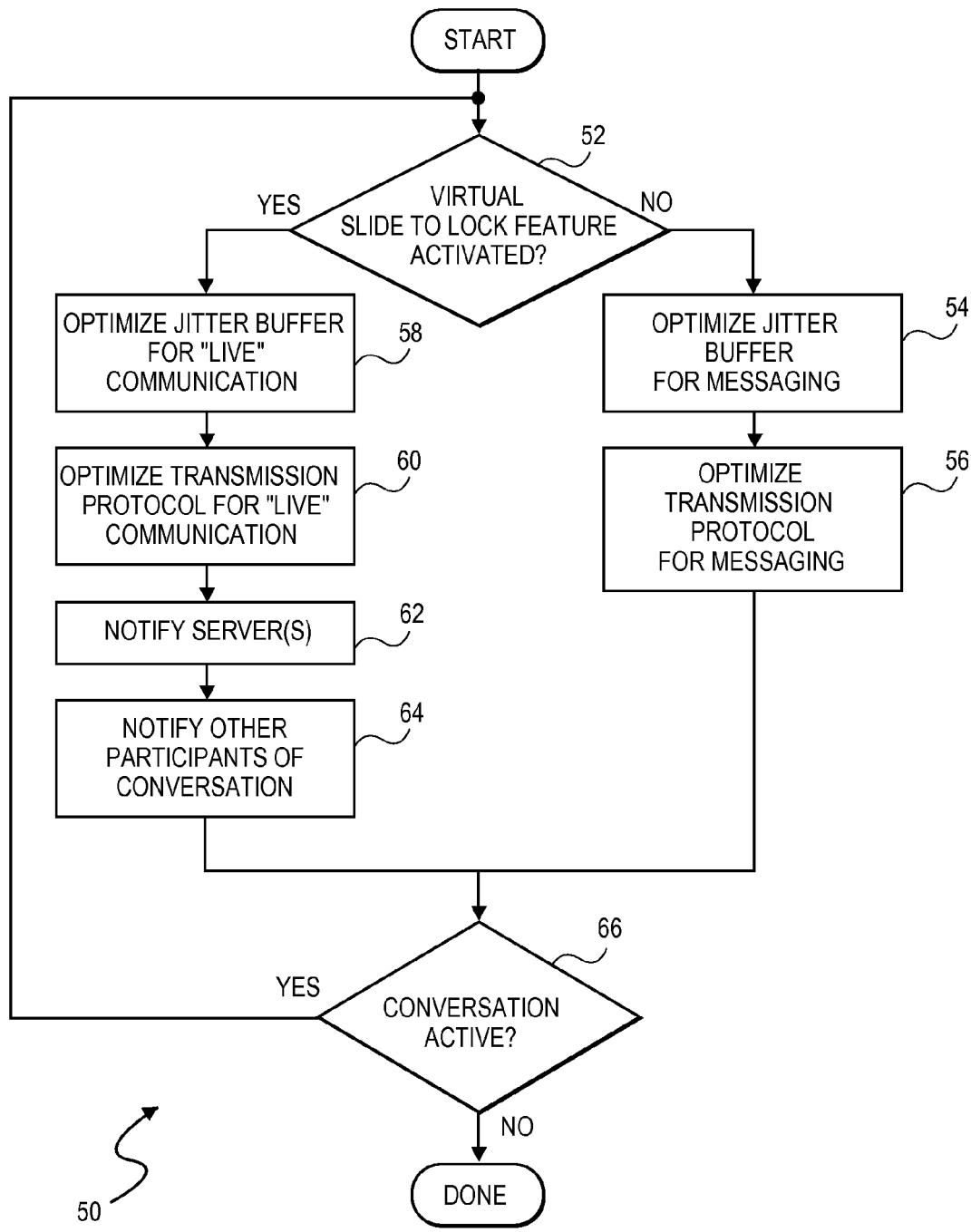
FIG. 4 is flow diagram illustrating the steps of another non-exclusive embodiment for implementing the virtual Slide-to-Lock feature in accordance with the principles of the present invention.

Referring to FIG. 4, a flow diagram 50 illustrating an optional embodiment of the present invention useful for progressive type PTT applications is illustrated. In this embodiment, it is determined if the virtual Slide-to-Lock feature 18 is activated or not (decision 52). If the virtual Slide-to-Lock feature is not activated, then the jitter buffer used for de-jittering incoming media (step 54) and the transmission protocol (step 56) used for transmitting outgoing media on the communication device 10 are optimized for non-live or time-shifted messaging. Alternatively, if the Slide-to-Lock feature 18 is implemented, then it is assumed that a full-duplex, live, conversation is taking place. As a result, a number of steps are taken on the communication device 10 to operate in a real-time or "live" call mode. For example, the jitter buffer may be optimized or tuned (step 58) for rendering incoming media as it is received over the network in real-time. In addition, the transmission protocol (step 60) for outgoing media may also be optimized for delivering media to intended recipients so that the media can be reviewed in near real-time or live. Further, steps can be taken on the network to enhance near real-time or live communication, such as notifying servers (step 62) on the network and other participants (step 64) of the conversation status so that they too can optimize operation and transmission protocols for real-time or live communication. As determined in decision 66, the above-described process is continually repeated, so long as the user actively participates in the conversation.

Figure 5:
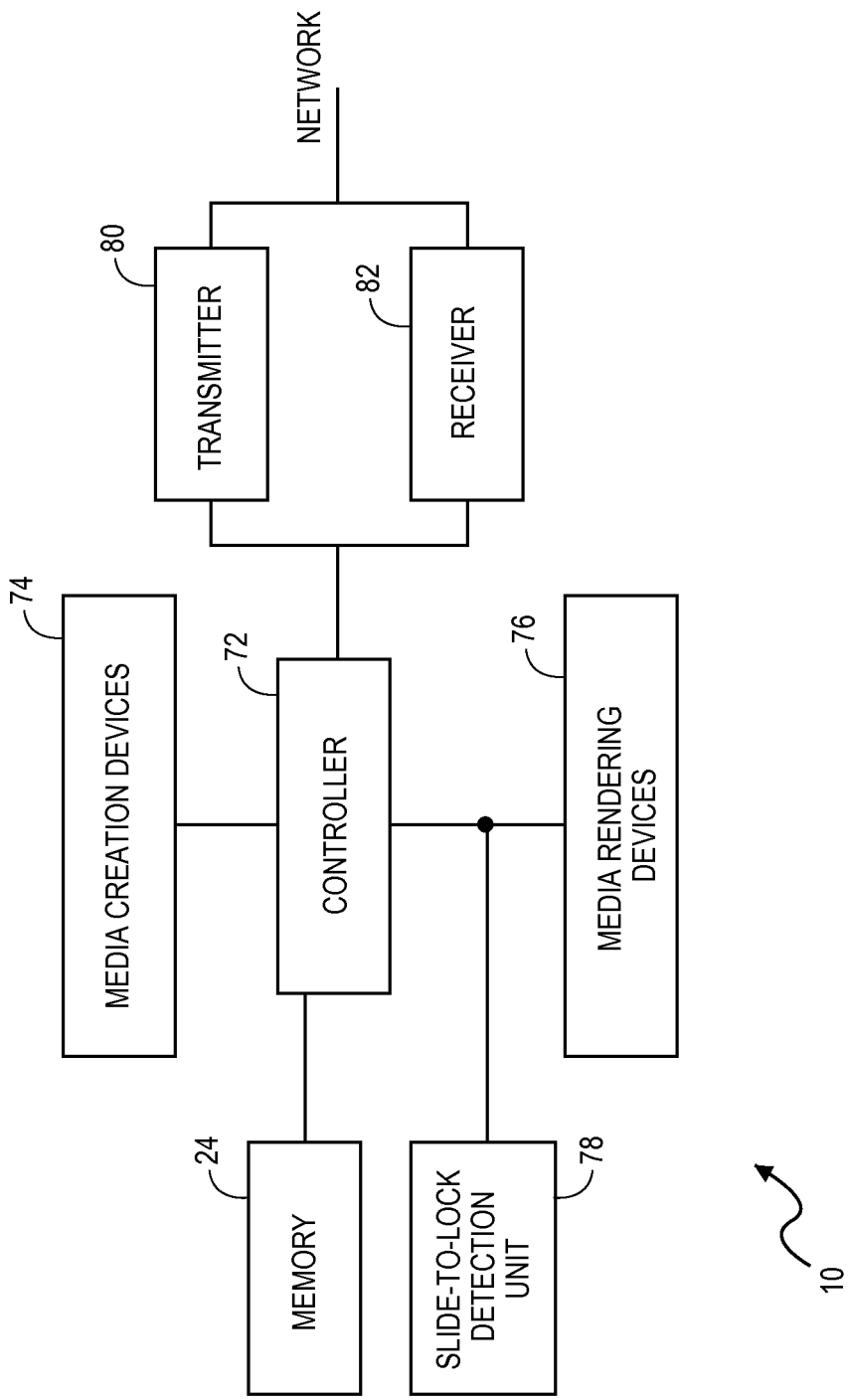
FIG. 5 is a block diagram of a communication device running an application including the Slide-to-Lock feature in accordance with the principle of the present invention.

Referring to FIG. 5, a block diagram of a communication device 10 running a PTT application including the Slide-to-Lock feature 18 is illustrated. In a non-exclusive embodiment, the Slide-to-Lock feature 18 is embedded in a PTT application, such as but not limited to Voxer. In this non-exclusive embodiment, the device 10 includes a controller 72, one or more media creation devices 74, such as a microphone, still and/or video camera, sensors, GPS unit, and keyboard, one or more media rendering devices 76, such as a speaker or touch-sensitive display screen 12, a Slide-to-Lock detection unit 78, a transmitter 80 and a receiver 82, both of which couple the device 10 to a network, and a memory 84 for storing the PTT application, as well as other data, such as media.

During execution of the PTT application, the Slide-to-Lock detection unit 78 monitors and detects the sliding motion as described above on the display screen 12 when the Slide-to-Lock feature 18 is either activated or de-activated. When either occurs, the controller 72 is notified and the PTT locking function is either activated or de-activated respectively. When activated, media created by the one or more of the media creating devices 74 is then progressively stored and/or transmitted, without the need to hold/select the Hold to Talk region 16 or similar PTT feature. When de-activated, then created media is progressively stored only when the Hold to Talk region 16 or similar PTT feature is selected. In various alternative embodiments, the created media may be (i) progressively stored in memory 24 and progressively transmitted by transmitter 80 when the media is created, or initially stored in memory 24 and transmitted out of storage after the message is complete. In various embodiments, the Slide-to-Lock detection unit 78 and controller 72 operate in cooperation with the touch-sensitive display screen 12 in a well known manner and may be implemented in hardware, software, firmware, or any combination thereof.

Figure 6A:
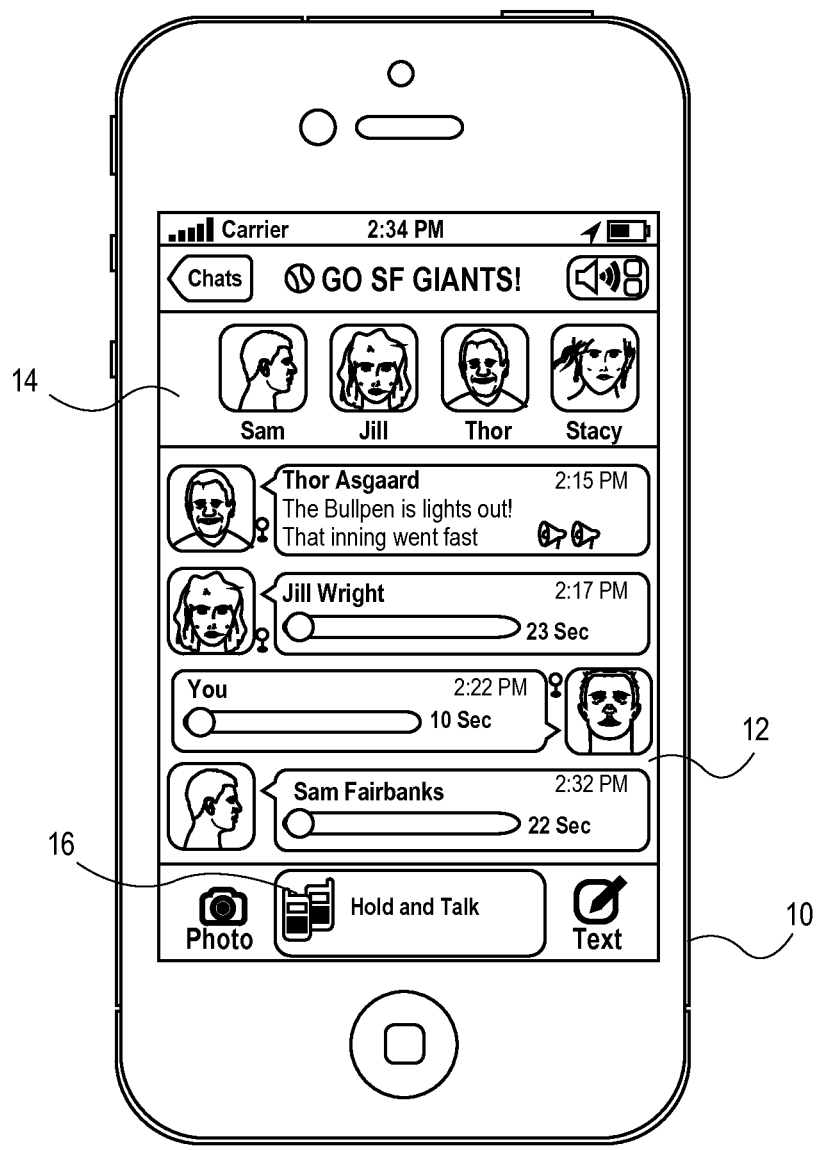
FIGS. 6A-6C are exemplary diagrams showing a non-exclusive "Tap-to-End" embodiment for de-activating the virtual Slide-to-lock feature in accordance with the principles of the present invention.
Figure 6B:
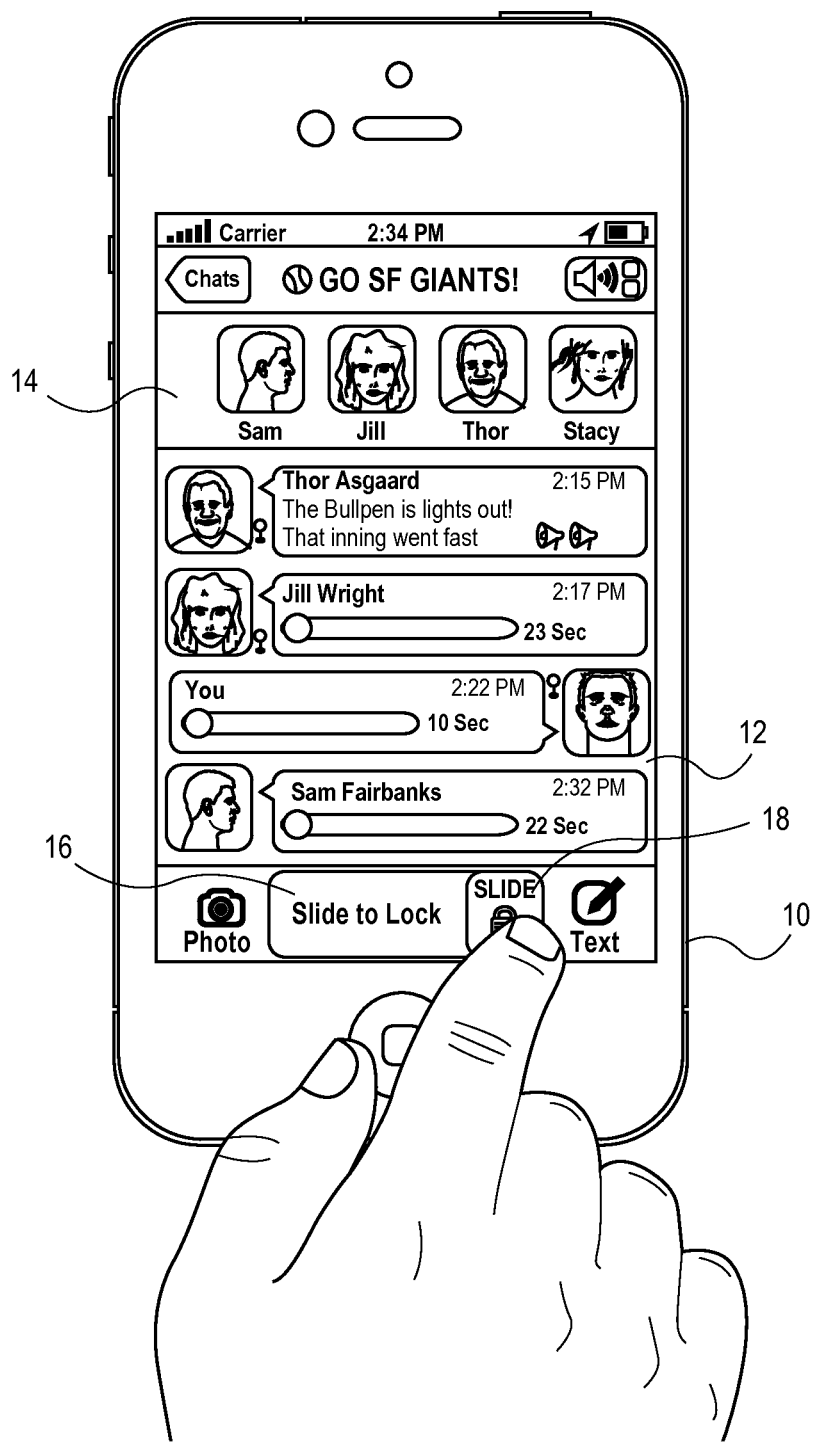
Figure 6C:
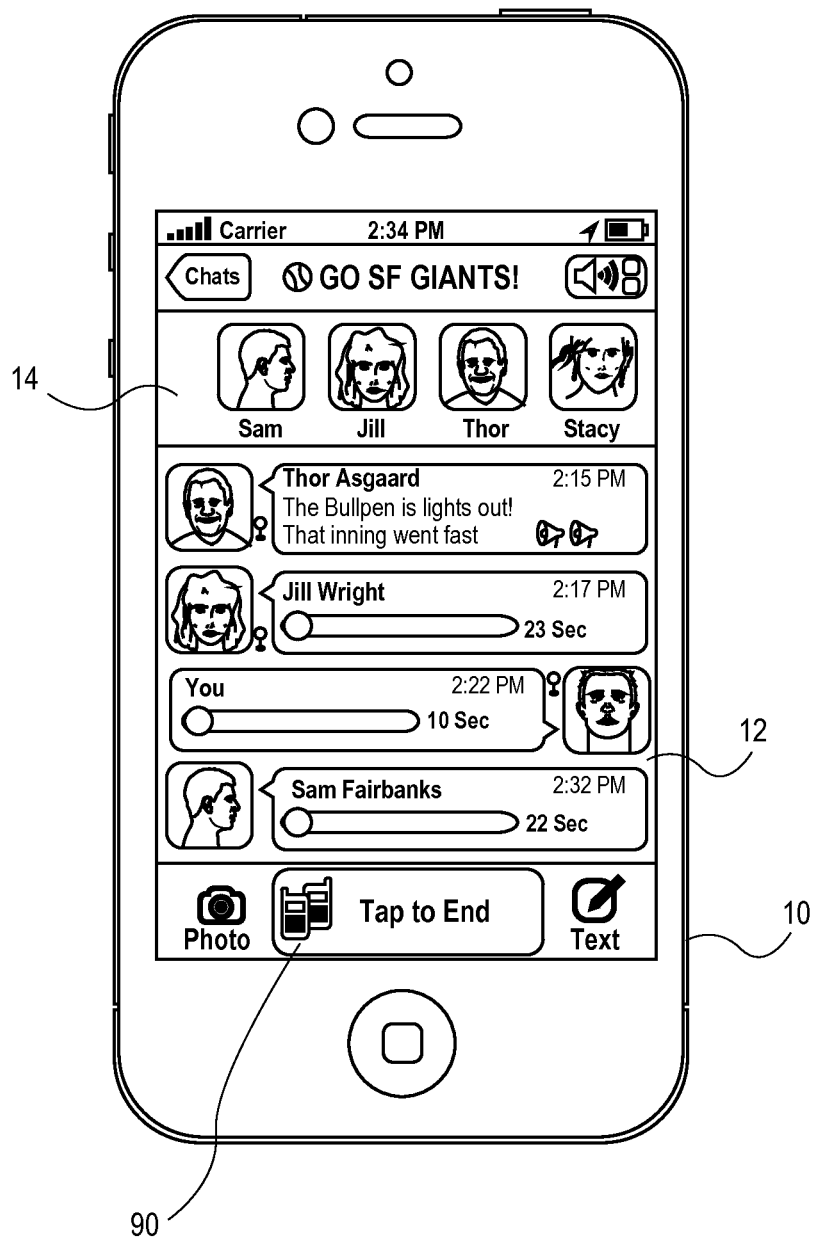

Referring to FIGS. 6A-6C, exemplary diagrams showing a non-exclusive "Tap-to-End" embodiment for de-activating the virtual Slide-to-lock feature in accordance with the principles of the present invention is shown. In FIG. 6A, the touch-screen 12 of device 10 is shown after the GO SF GIANTS conversation is selected. As previously noted, the selection results in the display of the conversation history and the Hold and Talk feature 16 on the touch screen 12. FIG. 6B illustrates the screen 12 after the Slide-to-Lock feature 18 is implemented, as described above. At this point, the user no longer has to contact the region 18 to generate and transmit voice media. After the user removes his/her finger, a "Tap to End" region 90 appears, as illustrated in FIG. 6C. When the Tap to End region 90 is tapped, the message is terminated and the device 10 stops transmitting media. The display screen 12 typically displays the Hold and Talk feature 16 again after the Tap to End feature 90 is implemented, unless the user transitions out of the GO SF GIANTS conversation or closes the application altogether.

In one embodiment, the user simply needs to tap the Tap-to-End feature 90 to implement the function. In alternative embodiments, the Tap-to-End feature 90 is implemented only after user contacts the region for a predetermined period of time, such as two or three seconds. Using such a time threshold prevents the inadvertent termination of the Slide-to-lock feature if the screen 12 is accidently contacted. With the threshold, generally a more deliberate action is required by the user to implement the transition. In yet other embodiments, the Tap-to-End feature 90 may be implemented anywhere on the display screen 12 of the communication device 10 running the PTT application including, but not limited to, in the vicinity of where the virtual Slide-to-lock 18 feature is implemented.

It should be also noted that the media transmitted, while the PTT locking function is activated by the Slide-to-Lock feature 18, can be any type of media. Such media may include, but is not limited to, voice, video, text, photos, sensor data, GPS or positional data, or any other type of streaming or non-streaming media.

Although the device 10 as illustrated resembles an iPhone from Apple, Cupertino, Calif., in no way should this be construed as limiting the present invention. On the contrary, the virtual PTT locking function of the present invention may be implemented on any PTT device 10, including a mobile phone, a mobile radio, a tablet computer, a laptop computer, or a desktop computer.

Lastly, the specific descriptive language "Slide-to-Lock" and Tap-to-End" as used and illustrated herein for describing the function and operation of the present application should not be construed as limiting. Rather, any descriptive language may be used for describing any feature that operates in a similar manner and that involves a sliding action for implementing a PTT locking function or for terminating a PTT locking function.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and methods and should not be restricted to the ones mentioned above. It is therefore intended that the invention be interpreted to include all variations and equivalents that fall within the true spirit and scope of the invention.

What is claimed is:

1. Computer code embedded in a non-transitory computer readable medium and intended to run on a communication device configured to communicate over a network, the computer code configured to provide on a display screen associated with the communication device a Tap-to -End feature for unlocking a virtual Slide-to-Lock lock feature on the display screen of the communication device running a PTT (Push-To-Talk) application.

2. The code of claim 1, wherein the Tap-to-End feature is implemented by tapping the display screen on the communication device running the PTT application.

3. The code of claim 1, wherein the Tap-to-End feature is implemented by contacting the display screen on the communication device running the PTT application for a predetermined period of time.

4. The code of claim 3, wherein the predetermined period of time is a threshold period for unlocking the Slide-to-lock feature when the threshold is exceeded.

5. The code of claim 4, wherein the threshold period is approximately 3 seconds or less.

6. The code of claim 1, wherein the virtual Slide-to-Lock feature enables the creation and transmission of a PTT message using the communication device without the need of continually activating a PTT function for the duration of the PTT message.

7. The code of claim 1, wherein the computer code is responsive to the implementation of the Tap-to-End feature by touching the display screen.

8. The code of claim 1, wherein the display screen associated with the communication device is a touch-sensitive display screen.

* * * * *